(12) United States Patent
Kubota

(10) Patent No.: US 10,908,526 B1
(45) Date of Patent: Feb. 2, 2021

(54) OPTICAL ARRAY, OPTICAL DEVICE, AND IMAGE FORMING APPARATUS

(71) Applicant: TOSHIBA TEC KABUSHIKI KAISHA, Tokyo (JP)

(72) Inventor: Atsushi Kubota, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/566,720

(22) Filed: Sep. 10, 2019

(51) Int. Cl.
*G03G 15/04* (2006.01)
*G02B 17/08* (2006.01)
*G02B 17/00* (2006.01)
*G02B 3/00* (2006.01)
*G03G 15/043* (2006.01)

(52) U.S. Cl.
CPC ....... *G03G 15/04036* (2013.01); *G02B 3/005* (2013.01); *G02B 3/0006* (2013.01); *G02B 17/002* (2013.01); *G02B 17/08* (2013.01); *G03G 15/0435* (2013.01); *G03G 15/04054* (2013.01); *G03G 15/04063* (2013.01); *G03G 15/04072* (2013.01)

(58) Field of Classification Search
CPC ......... G03G 15/0435; G03G 15/04036; G03G 15/04054; G03G 15/04063; G03G 15/04072; G02B 3/005; G02B 3/0006; G02B 17/002; G02B 17/08
See application file for complete search history.

(56) References Cited

U.S. PATENT DOCUMENTS

| 9,977,364 | B1 * | 5/2018 | Shiraishi | G03G 15/04036 |
| 2013/0100514 | A1 * | 4/2013 | Shiraishi | G02B 26/0875 359/201.1 |
| 2013/0229703 | A1 | 9/2013 | Kubota et al. | |
| 2013/0229714 | A1 | 9/2013 | Kubota et al. | |
| 2013/0235434 | A1 | 9/2013 | Akiyama et al. | |
| 2013/0235451 | A1 | 9/2013 | Kubota et al. | |
| 2013/0314754 | A1 * | 11/2013 | Shiraishi | H04N 1/0311 358/475 |
| 2013/0314797 | A1 * | 11/2013 | Shiraishi | G02B 26/101 359/627 |
| 2014/0204430 | A1 * | 7/2014 | Shiraishi | H04N 1/02825 358/474 |
| 2014/0204474 | A1 * | 7/2014 | Shiraishi | G03G 13/04 359/730 |
| 2015/0266313 | A1 | 9/2015 | Kubota et al. | |
| 2016/0216634 | A1 * | 7/2016 | Shiraishi | G02B 17/002 |
| 2016/0216635 | A1 | 7/2016 | Shiraishi | |
| 2017/0176648 | A1 | 6/2017 | Kubota et al. | |
| 2017/0351194 | A1 * | 12/2017 | Shiraishi | G03G 15/0409 |
| 2018/0128945 | A1 | 5/2018 | Kubota et al. | |

(Continued)

FOREIGN PATENT DOCUMENTS

JP 2015052708 A * 3/2015
JP 2017038401 A * 2/2017

*Primary Examiner* — Ryan D Walsh
(74) *Attorney, Agent, or Firm* — Kim & Stewart LLP

(57) ABSTRACT

An optical array includes a plurality of optical elements arrayed in a longitudinal direction of the optical array, each of the optical elements comprises a convex portion, a part of which is surrounded by a first groove, and a pair of flange sections between which the optical elements are arrayed. A second groove that communicates with the first groove of each optical element is formed on at least one of the flange sections.

20 Claims, 14 Drawing Sheets

(56) References Cited

U.S. PATENT DOCUMENTS

2018/0259756 A1* 9/2018 Shiraishi ................ G02B 3/005
2019/0354035 A1* 11/2019 Shiraishi .................. G02B 5/09
2020/0106911 A1* 4/2020 Shiraishi ............ H04N 1/02825

* cited by examiner

OPTICAL ARRAY, OPTICAL DEVICE, AND IMAGE FORMING APPARATUS

FIELD

Embodiments described herein relate generally to an optical array, an optical device, and an image forming apparatus.

BACKGROUND

An image forming apparatus focuses lights, which are emitted from light emitting elements, on an image surface via an optical array. In the optical array, optical elements such as mirrors are linearly arrayed to reflect the lights emitted from the light emitting elements. A light blocking material is applied to a predetermined region of the optical array in order to forma light blocking film that cuts unnecessary light. However, the light blocking film may be formed in an unintended portion of the optical array. One of the reasons is that the light blocking material is liquid when applied, so it quickly flows and spreads to a portion of the optical array where the light blocking film should not be formed.

DETAILED DESCRIPTION

Figure 1:
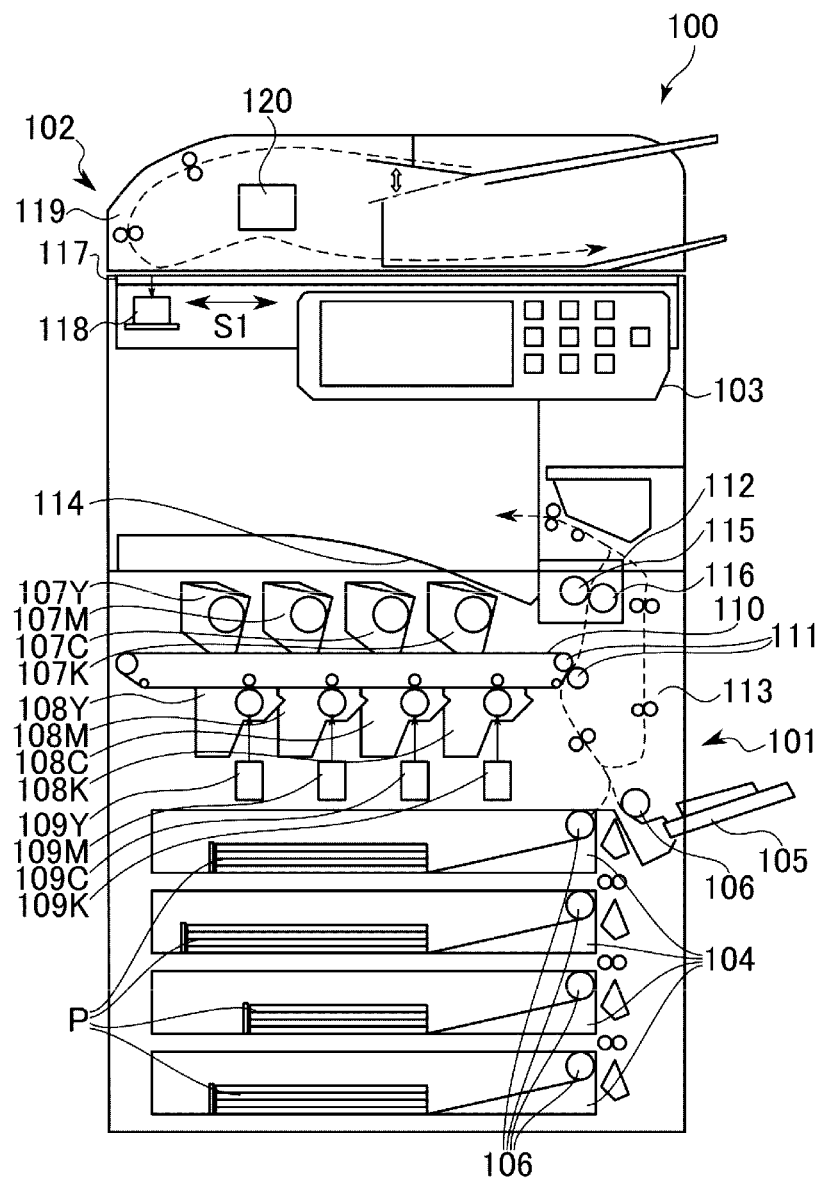
FIG. 1 is a diagram illustrating an image forming apparatus according to first to third embodiments.

An optical array according to an embodiment includes a plurality of optical elements arrayed in a longitudinal direction of the optical array, each of the optical elements comprises a convex portion, a part of which is surrounded by a first groove, and a pair of flange sections between which the optical elements are arrayed. A second groove that communicates with the first groove of each optical element is formed on at least one of the flange sections.

Image forming apparatuses according to several embodiments are explained below with reference to the drawings. In the drawings, the scale of each component may vary. In the drawings, the components are simplified for the purpose of illustration. In the drawings and the following explanation, the same numbers are assigned to the same elements.

First Embodiment

FIG. 1 is a block diagram illustrating an image forming apparatus 100 according to a first embodiment.

The image forming apparatus 100 is, for example, an MFP (multifunction peripheral), a copying machine, a printer, or a facsimile. In the following explanation, it is assumed that the image forming apparatus 100 is an MFP. The image forming apparatus 100 includes, for example, a printing function, a scanning function, a copying function, and a facsimile function. The printing function is a function for forming an image on image forming media P or the like using a recording material such as toner. The image forming media P are, for example, sheet-like paper. The scanning function is a function for reading an image from a document. The copying function is a function for printing the image, which is read from the document or the like using the scanning function, on the image forming media P using the printing function. As an example, the image forming apparatus 100 includes a printer 101, a scanner 102, and an operation panel 103.

As an example, the printer 101 includes paper feeding trays 104, a manual feed tray 105, paper feeding rollers 106, toner cartridges 107, image forming sections 108, scanning heads 109, a transfer belt 110, a secondary transfer roller 111, a fixing unit 112, a duplex unit 113, and a paper discharge tray 114.

The paper feeding trays 104 store the image forming media P used for printing.

The manual feed tray 105 is a stand for manually feeding the image forming media P.

The paper feeding rollers 106 rotate with action of a motor to carryout the image forming media P stored in the paper feeding trays 104 or the manual feed tray 105.

The toner cartridges 107 store recording materials such as toners to be supplied to the image forming units 108. The image forming apparatus 100 includes one or more toner cartridges 107. As an example, the image forming apparatus 100 includes, as illustrated in FIG. 1, four toner cartridges 107, that is, a toner carriage 107C, a toner cartridge 107M, a toner cartridge 107Y, and a toner cartridge 107K. The toner cartridge 107C, the toner cartridge 107M, the toner cartridge 107Y, and the toner cartridge 107K store recording materials respectively corresponding to colors of CMYK (cyan, magenta, yellow, and key). That is, the toner cartridge 107C stores a recording material of cyan. The toner cartridge 107M stores a recording material of magenta. The toner cartridge 107Y stores a recording material of yellow. The toner cartridge 107K stores a recording material of black. The colors of the recording materials stored by the toner cartridges 107 are not limited to the colors of CMYK and may be other colors.

The image forming apparatus 100 includes one or more image forming units 108. As an example, the image forming apparatus 100 includes, as illustrated in FIG. 1, four image forming units 108, that is, an image forming unit 108C, an image forming unit 108M, an image forming unit 108Y, and an image forming unit 108K. The image forming unit 108C, the image forming unit 108M, the image forming unit 108Y, and the image forming unit 108K form images with recording materials respectively corresponding to the colors of CMYK. That is, the image forming unit 108C forms an image of cyan. The image forming unit 108M forms an image of magenta. The image forming unit 108Y forms an image of yellow. The image forming unit 108K forms an image of black.

The image forming apparatus 100 includes one or more scanning heads 109. As an example, the image forming apparatus 100 includes, as illustrated in FIG. 1, four scanning heads 109, that is, a scanning head 109C, a scanning head 109M, a scanning head 109Y, and a scanning head 109K. The scanning head 109C, the scanning head 109M, the scanning head 109Y, and the scanning head 109K form electrostatic latent images respectively corresponding to the colors of CMYK on the surfaces of photoconductive drums 1081 corresponding to the colors. That is, the scanning head 109C forms an electrostatic latent image of cyan. The scanning head 109M forms an electrostatic latent image of magenta. The scanning head 109Y forms an electrostatic latent image of yellow. The scanning head 109K forms an electrostatic latent image of black. The scanning heads 109 form electrostatic latent images on the surfaces of the photoconductive drums 1081 according to a solid-state scanning system.

Figure 2:
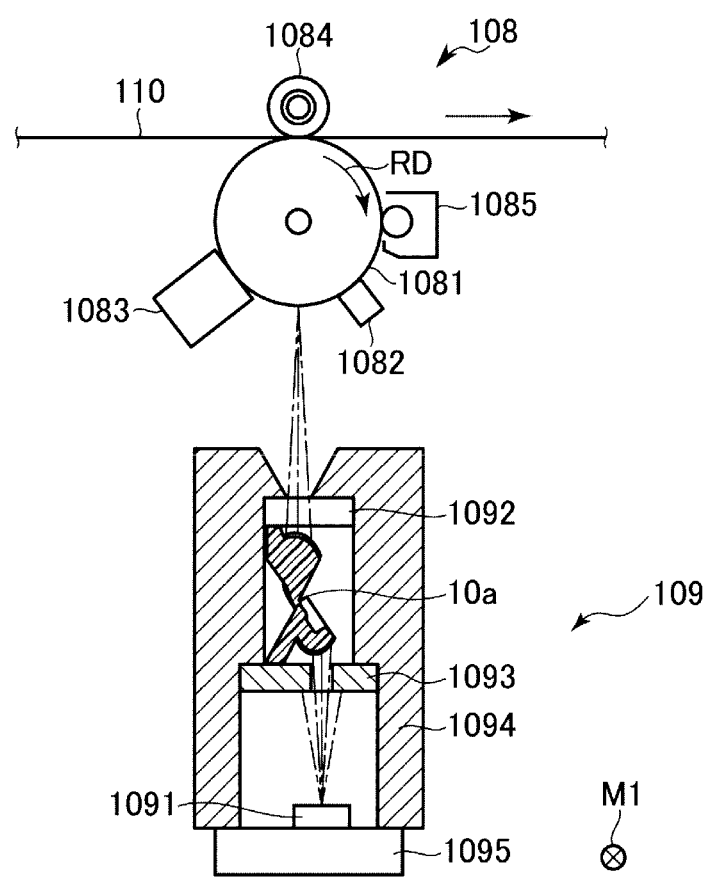
FIG. 2 is a diagram illustrating an image forming unit and a scanning head illustrated in FIG. 1.

The image forming unit 108 and the scanning head 109 are further explained with reference to FIG. 2. FIG. 2 is a schematic diagram of the image forming unit 108 and the scanning head 109.

As an example, the image forming unit 108 includes the photoconductive drum 1081, a charging unit 1082, a developing unit 1083, a primary transfer roller 1084, and a cleaner 1085.

The surface of the photoconductive drum 1081 is exposed to light irradiated from the scanning head 109. Consequently, an electrostatic latent image is formed on the surface of the photoconductive drum 1081.

The charging unit 1082 charges the surface of the photoconductive drum 1081 with a predetermined positive charge.

The developing unit 1083 develops the electrostatic latent image on the surface of the photoconductive drum 1081 using a recording material supplied from a toner cartridge. Consequently, an image by the recording material is formed on the surface of the photoconductive drum 1081.

The primary transfer roller 1084 generates a transfer voltage between the primary transfer roller 1084 and the photoconductive drum 1081. Consequently, the primary transfer roller 1084 transfers the image formed on the surface of the photoconductive drum 1081 onto a transfer belt.

The cleaner 1085 removes the recording material remaining on the surface of the photoconductive drum 1081.

As an example, the scanning head 109 includes an optical array 10a, a light source 1091, a protective glass 1092, a light blocking body 1093, a housing 1094, and a substrate 1095.

The optical array 10a is an optical component that focuses light emitted from the light source 1091 on an image surface, which is a predetermine region, on the surface of the photoconductive drum 1081. The predetermined region is, for example, a belt-like region on the entire side circumferential surface of the photoconductive drum 1081. That is, the optical array 10a focuses lights emitted from a plurality of light emitting elements on the image surface to form an electrostatic latent image. The optical array 10a is explained more in detail below.

In the light source 1091, light emitting elements such as LEDs (light-emitting diodes), organic EL (electro-luminescence) elements, fluorescent tubes, or laser oscillators are arrayed in one row or a plurality of rows. The light source 1091 emits light.

The protective glass 1092 is transparent glass or transparent resin provided between the optical array 10a and the photoconductive drum 1081. The protective glass 1092 protects the optical array 10a. The protective glass 1092 prevents, for example, adhesion of the recording material, dust, and the like to the optical array 10a.

The light blocking body 1093 is provided between the optical array 10a and the light source 1091. The light blocking body 1093 is, for example, a member to which a light blocking material is applied. The light blocking body 1093 blocks a part of lights emitted from the light emitting elements included in the light source 1091. For example, the light blocking body 1093 blocks lights passing positions with a predetermined distance or more apart from an optical axis of the lights emitted by the light emitting elements.

The housing 1094 is a member that houses the light source 1091, the optical array 10a, the protective glass 1092, the light blocking body 1093, and the substrate 1095. The housing 1094 includes a light blocking section that blocks a part of light emitted from the optical array 10a. The light blocking section blocks light that changes to stray light on the photoconductive drum 1081. The light blocking section blocks, for example, light emitted from the optical array 10a and not directed towards the image surface.

The substrate 1095 is a circuit board on which the light source 1091, a driving circuit that drives the light source 1091, and the like are mounted.

Referring back to FIG. 1, the transfer belt 110 is, for example, an endless belt and is capable of rotating according to action of a roller. The transfer belt 110 rotates to convey images transferred from the image forming sections 108 to the position of the secondary transfer roller 111.

The secondary transfer roller 111 includes two rollers opposed to each other. The secondary transfer roller 111 transfers the image formed on the transfer belt 110 onto the image forming medium P passing between the two rollers of the secondary transfer roller 111.

The fixing unit 112 performs heating and pressurizing on the image forming medium P onto which the image is transferred. Consequently, the image transferred onto the image forming medium P is fixed. The fixing unit 112 includes, for example, a heating unit 115 and a pressurizing roller 116 opposed to each other.

The heating unit 115 is, for example, a roller including a heat source for heating the heating unit 115. The heat source is, for example, a heater. The roller heated by the heat source heats the image forming medium P.

The pressurizing roller 116 pressurizes the image forming medium P passing between the pressurizing roller 116 and the heating section 115.

The duplex unit 113 brings the image forming medium P into a state in which printing on the backside of the image forming medium P is possible. For example, the duplex unit 113 switches back the image forming medium P using a roller or the like to reverse the image forming medium P.

The paper discharge tray 114 is a stand to which the image forming medium P, on which the printing is finished, is discharged.

The scanner 102 is a scanner of an optical reduction scheme including an imaging element such as a CCD (charge-coupled device) image sensor. Alternatively, the scanner 102 is a scanner of a contact image sensor (CIS) type including an imaging element such as a CMOS (complementary metal-oxide-semiconductor) image sensor. Alternatively, the scanner 102 may be a scanner of another publicly-known type. The scanner 102 reads an image printed a document. As an example, the scanner 102 includes a document stand 117, a reading module 118, a document feeding device 119, and a back-surface reading module 120.

The document stand 117 is a stand for holding a document thereon. The document stand 117 is, for example, a plate made of transparent glass or transparent resin. Light reflected on the document is transmitted through the document stand 117 and enters the reading module 118.

Figure 3:
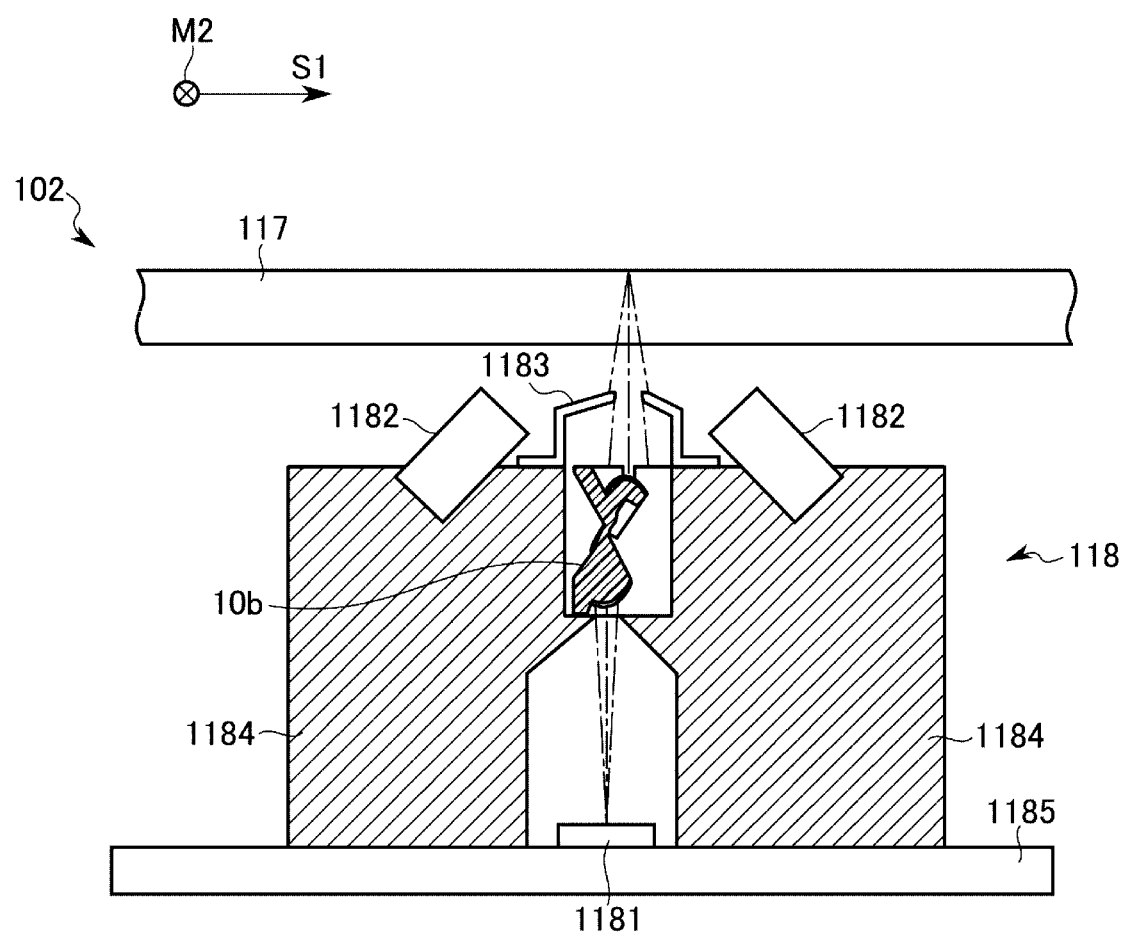
FIG. 3 is a diagram illustrating a reading module illustrated in FIG. 1.

The reading module 118 is explained with reference to FIG. 3. FIG. 3 is a diagram illustrating the reading module 118. The reading module 118 converts incident light into a digital signal with an image sensor. Consequently, the reading module 118 reads an image from the surface of a document. The reading module 118 is movable in a sub-scanning direction S1. Consequently, the reading module 118 is capable of scanning the surface of the document and reading the image. A main scanning direction M1 and the sub-scanning direction S1 are orthogonal. The main scanning direction M1 and the sub-scanning direction S1 are parallel to the upper surface of the document stand 117. As an example, the reading module 118 includes an optical array 10a, an image sensor 1181, a light 1182, a light blocking body 1183, a housing 1184, and a substrate 1185.

An optical array 10b has the same configuration as the configuration of the optical array 10a included in the scanning head 109. However, the optical array 10b may have a shape obtained by mirror-reversing the optical array 10a. The optical array 10b is attached in a direction vertically opposite to the direction of the optical array 10a. The optical array 10b is an optical component that focuses light made incident from a predetermined reading range on pixels of the image sensor 1181. The reading range is a rectangular region on the document stand 117. The optical array 10b combines light reflected by the original document placed on the document stand 117 with the pixels of the image sensor 1181. The optical array 10b is explained more in detail below.

The image sensor 1181 is a CCD image sensor, a CMOS image sensor, or another imaging element. The image sensor 1181 is, for example, a line sensor in which pixels that convert light into an electric signal (i.e., an image signal) are linearly arranged.

The light 1182 emits light onto the document placed on the document stand 117. The light 1182 includes a light source and a light guide body that guides light emitted by the light source. The light source is, for example, an LED, an organic EL element, or a fluorescent tube. The light guide body guides the light emitted from the light source and emits the light onto a region including the reading range explained above. The light guide body guides the light emitted from the light source and emits the light onto the document.

The light blocking body 1183 blocks light from the outside of the reading range and prevents the light from entering the optical array 10b. The light blocking body 1183 is, for example, a member to which a light blocking material is applied.

The housing 1184 is a member that houses the image sensor 1181, the optical array 10b, the light 1182, the light blocking body 1183, and the substrate 1185. The housing 1184 includes a light blocking section that blocks a part of light emitted from the optical array 10b. The light blocking section blocks light that changes to stray light on the image sensor 1181. The light blocking section blocks light emitted from the optical array 10b and not directed towards the image sensor 1181.

The substrate 1185 is a circuit board including a circuit that executes various kinds of processing concerning an image signal. The substrate 1185 reads out an image signal from the image sensor 1181. The substrate 1185 performs signal processing on the image signal and acquires an image. Further, the substrate 1185 includes a memory that temporarily stores the image.

Referring back to FIG. 1, the document feeding device 119 is called, for example, ADF (auto document feeder) as well. The document feeding device 119 conveys documents placed on a tray one after another. The document feeding device 119 includes a roller and a motor for conveying the documents. An image on the conveyed document is read by the scanner 102. In the above explanation, the reading module 118 moves in the sub-scanning direction S1 to read the image from the document. However, in reading the document using the document feeding device 119, the image forming apparatus 100 does not move the reading module 118 and conveys the document in the sub-scanning direction S1. Consequently, the image forming apparatus 100 reads the image from the document. The document feeding device 119 includes a back-surface reading module 120.

The back-surface reading module 120 reads an image from the rear surface of the original document conveyed by the document feeding device 119. The back-surface reading module 120 includes, for example, the same configuration as the configuration of the reading module 118. The image forming apparatus 100 can read images from both the surfaces of the original document conveyed by the document feeding device 119 by using the reading module 118 and the back-surface reading module 120.

The operation panel 103 includes a man-machine interface or the like that performs input and output between the image forming apparatus 100 and an operator of the image forming apparatus 100. The operation panel 103 includes, for example, an input device such as a button and a touch panel.

Figure 4:
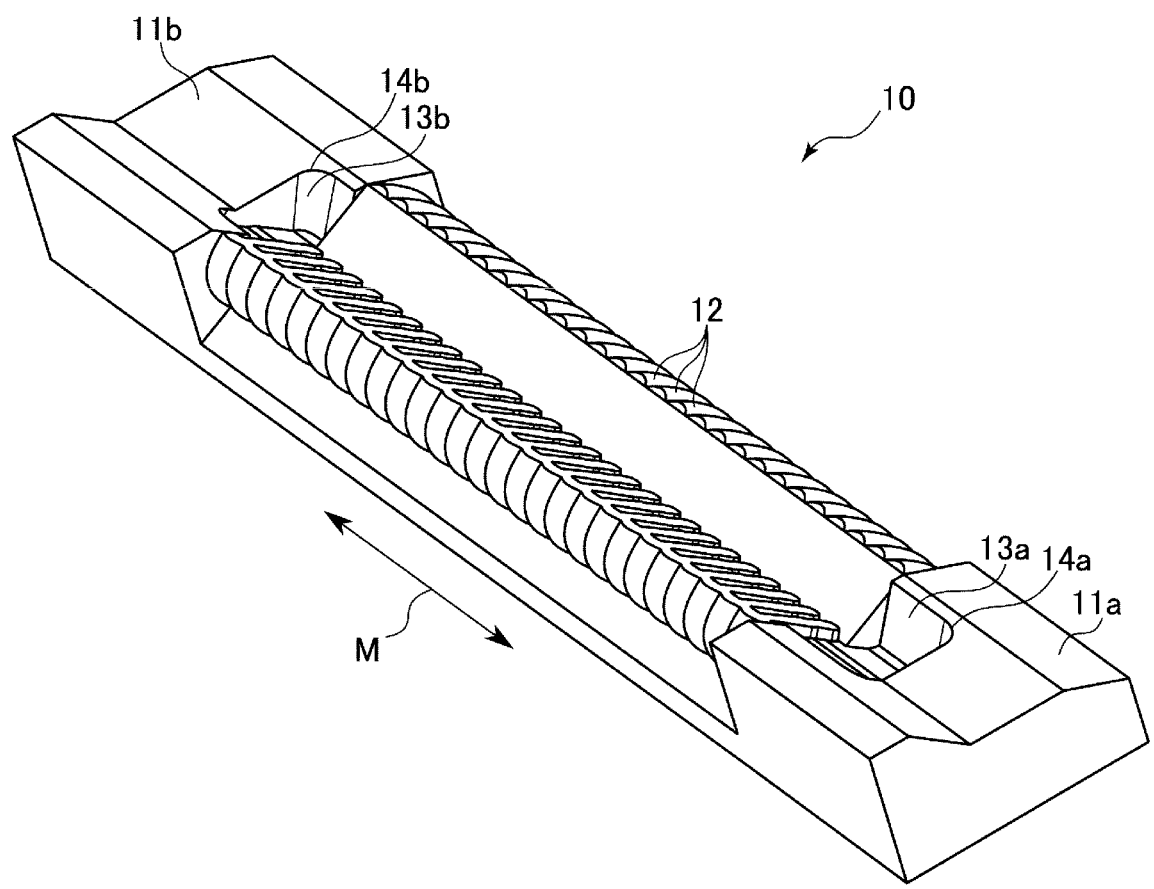
FIG. 4 is a perspective view of an optical array according to the first embodiment illustrated in FIGS. 2 and 3.

The optical array 10a and the optical array 10b are explained below with reference to the figures. The optical array 10a and the optical array 10b are collectively referred to as optical array 10. FIG. 4 is a perspective schematic view of the optical array 10. A main scanning direction M in FIG. 4 is a general term of the main scanning direction M1 and a main scanning direction M2.

The optical array 10 is made of, for example, transparent resin. Alternatively, the optical array 10 may be made of transparent glass or the like. The optical array 10 is integrally formed by, for example, injection molding or 3D (three-dimensional) printing. The longitudinal direction of the optical array 10 is the main scanning direction M. The optical array 10 includes two flange sections 11, a plurality of optical elements 12, two escape regions 13 (i.e., an escape region 13a and an escape region 13b), and two edges 14 (i.e., an edge 14a and an edge 14b).

The optical array 10 includes the two flange sections 11, that is, a flange section 11a and a flange section 11b. The flange sections 11 are used for, for example, attachment of the optical array 10. The flange sections 11 are provided at both ends of the optical array 10 to sandwich the plurality of optical elements 12. Therefore, in the optical array 10, the flange section 11a, the plurality of optical elements 12, and the flange 11b are arranged in the main scanning direction M in this order.

In the optical array 10, the plurality of optical elements 12 having the same shape are arranged in the main scanning direction M. The optical elements 12 have a function for focusing incident light on a focusing target. For example, the optical elements 12 focus light emitted from the light source 1091 on the image surface on the photoconductive drum 1081. For example, the optical elements 12 focus, on the image sensor 1181, light reflected on the document.

Figure 5:
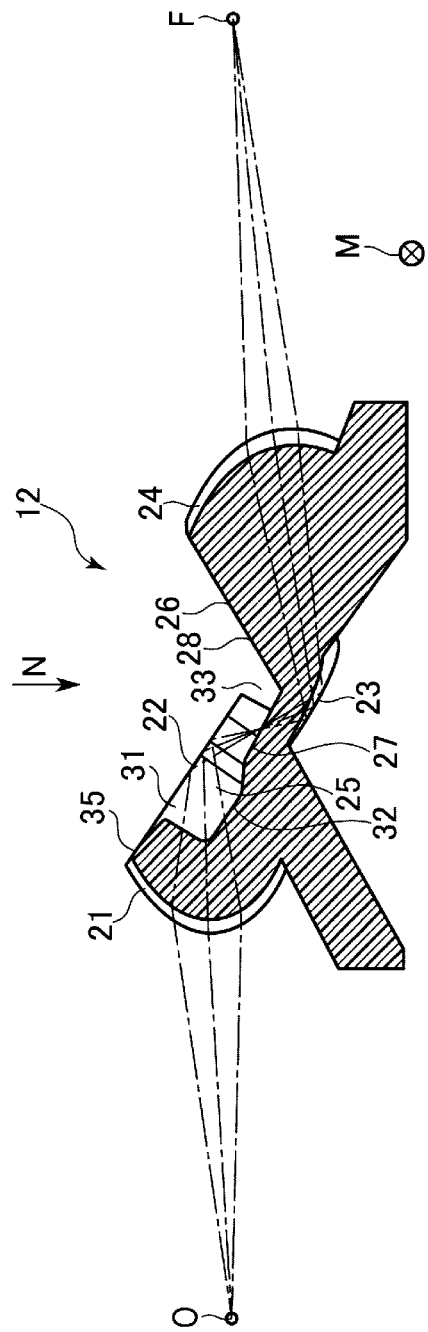
FIG. 5 is a plan view an optical element illustrated in FIG. 4.

FIG. 5 is a diagram illustrating one optical element 12 cut off from the optical array 10. FIG. 5 is a plan view of the optical element 12 viewed from the flange section 11a side. A cut surface of the optical array 10 and the main scanning direction M are orthogonal to each other. FIG. 5 is a ray diagram illustrating a track of light that has entered the optical array 10 from an object point O and converged at a focusing point F. For example, the optical element 12 is surface-symmetrical to a symmetrical plane X perpendicular to the main scanning direction M. As an example, the optical element 12 includes a first lens surface 21, a first mirror surface 22, a second mirror surface 23, a second lens surface 24, a first light blocking surface 26, a second light blocking surface 25, and a third light blocking surface 27.

The surface of the first lens surface 21 is, for example, a convex surface projecting to the outer side of the optical array 10. The shape of the first lens surface 21 is, for example, a free curved surface shape surface-symmetrical to a symmetrical plane X. Two main curvatures of any point on the first lens surface 21 may be the same or may not be the same. A curvature of the first lens surface 21 may be constant or may not be constant. The curvature of the first lens surface 21 may change by a predetermined change amount along the surface. The first lens surface 21 may be a part of a spherical surface.

The first lens surface 21 functions as a lens. Light emitted from the light source 1091 enters the first lens surface 21. Alternatively, light reflected on the document enters the first lens surface 21. The first lens surface 21 causes incident light to converge and forms an intermediate inverted image. The first lens surface 21 functions as the incident surface.

The first mirror surface 22 is an upper surface of a portion formed in a convex shape (i.e., a first convex section 31). The first mirror surface 22 is, for example, a plane.

The first mirror surface 22 reflects, with total reflection or Fresnel reflection, light that has entered through the first lens surface 21. The light that has entered through the first lens surface 21 forms an intermediate inverted image after being reflected on the first mirror surface 22.

The second mirror surface 23 is formed on the opposite side of the first mirror surface 22 of the optical element 12. The second mirror surface 23 is formed in, for example, a rectangular shape and is formed to curve inward. The shape of the second mirror surface 23 is, for example, a free curved surface shape surface-symmetrical to the symmetrical plane X. Two main curvatures may be the same or may not be the same at any point on the second mirror surface 23. A curvature of the second mirror surface 23 may be constant or may not be constant. The curvature of the second mirror surface 23 may change by a predetermined change amount along the surface. The second mirror surface 23 may be a part of a spherical surface. The second mirror surface 23 may be a plane.

The second mirror surface 23 reflects, with total reflection or Fresnel reflection, light reflected on the first mirror surface 22.

The surface of the second lens surface 24 is, for example, a convex surface projecting to the outer side of the optical array 10. The shape of the second lens surface 24 is, for example, a free curved surface shape surface-symmetrical to the symmetrical plane X. Two main curvatures may be the same or may not be the same at any point on the second lens surface 24. A curvature of the second lens surface 24 may be constant or may not be constant. The curvature of the second lens surface 24 may change by a predetermined change amount along the surface. The second lens surface 24 may be a part of a spherical surface.

The second lens surface 24 functions as a lens. The second lens surface 24 emits light reflected on the second mirror surface 23 to the outside of the optical array 10. The second lens surface 24 cooperates with the second mirror surface 23 to form an erected image, which is an inverted image of the intermediate inverted image formed by the first lens surface 21. Light emitted from the second mirror surface 23 is focused at the predetermined focusing point F. The focusing point F is a point on the image surface on the surface of the photoconductive drum 1081 or a point on the image sensor 1181.

The first light blocking surface 26, the second light blocking surface 25, and the third light blocking surface 27 have, on the surface of the optical array 10, a light blocking layer 28 that blocks light. The light blocking layer 28 is, for example, a layer obtained by hardening the light blocking material applied to the surface of the optical array 10. That is, the first light blocking surface 26 and the second light blocking surface 25 are formed by applying the light blocking material to the surface of the optical array 10. The light blocking material is, for example, ink having a high light blocking property containing, as a base material, polymer or the like having the same or substantially the same refractive index as the refractive index of the optical array 10. The light blocking material is, for example, UV (ultraviolet) ink containing a light blocking material such as carbon black, pigment, or dye. The UV ink is ink hardened by irradiation of an ultraviolet ray. The light blocking material may be ink hardened by irradiation of light other than the ultraviolet ray, radiation, or the like. Alternatively, the light blocking material may be ink hardened by other methods such as heating.

The first light blocking surface 26 is a surface extending from the flange section 11a to the flange section 11b. The first light blocking surface 26 prevents light emitted from the optical array 10 and not reflected on the first mirror 22 from entering the optical array 10 again.

The second light blocking surface 25 is a side surface of the first convex section 31, an upper bottom surface of which is the first mirror surface 22. The second light blocking surface 25 prevents light in the optical array 10 from being reflected on the second light blocking surface 25. The second light blocking surface 25 prevents the light in the optical array 10 from being emitted to the outside of the optical array 10.

The third light blocking surface 27 includes a bottom surface of a groove between the first convex sections 31 of adjacent optical elements 12 (i.e., a first concave section 32). The third blocking surface 27 includes a surface between the first convex section 31 and the first light blocking surface 26 and extending from the flange section 11a to the flange section 11b. The third light blocking surface 27 has, for example, a step. The third light blocking surface 27 and the first light blocking surface 26 are connected in a V shape. A groove-like second concave section 33 is formed by a part of the first light blocking surface 26, a part of the second light blocking surface 25, and the third light blocking surface 27. The part of the first light blocking surface 26 is a surface between the flange section 11a and the flange section 11b, and extends from the flange section 11a to the flange section 11b. The part of the second light blocking surface 25 is a downstream-side side surface of the first convex section 31. The second concave section 33 is located between the flange section 11a and the flange section 11b, and extends from the flange section 11a to the flange section 11b. The first convex section 31 is formed on the third light blocking surface 27. The third light blocking surface 27 prevents the light in the optical array 10 from being reflected on the third light blocking surface 27. The third light blocking surface 27 prevents the light in the optical array 10 from being emitted to the outside of the optical array 10.

Figure 6:
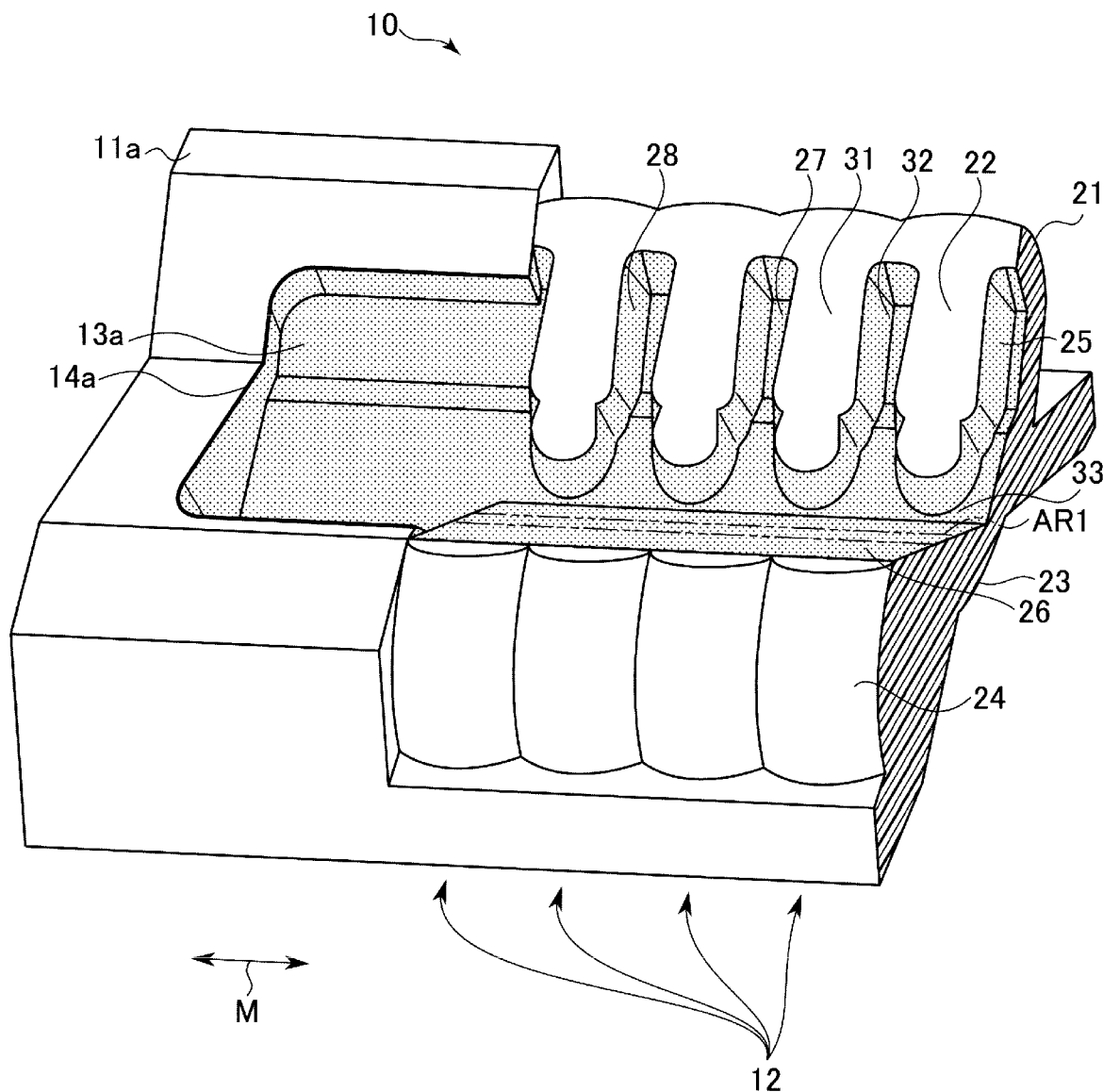
FIG. 6 is a perspective view of a part of the optical array illustrated in FIGS. 2 and 3.
Figure 7:
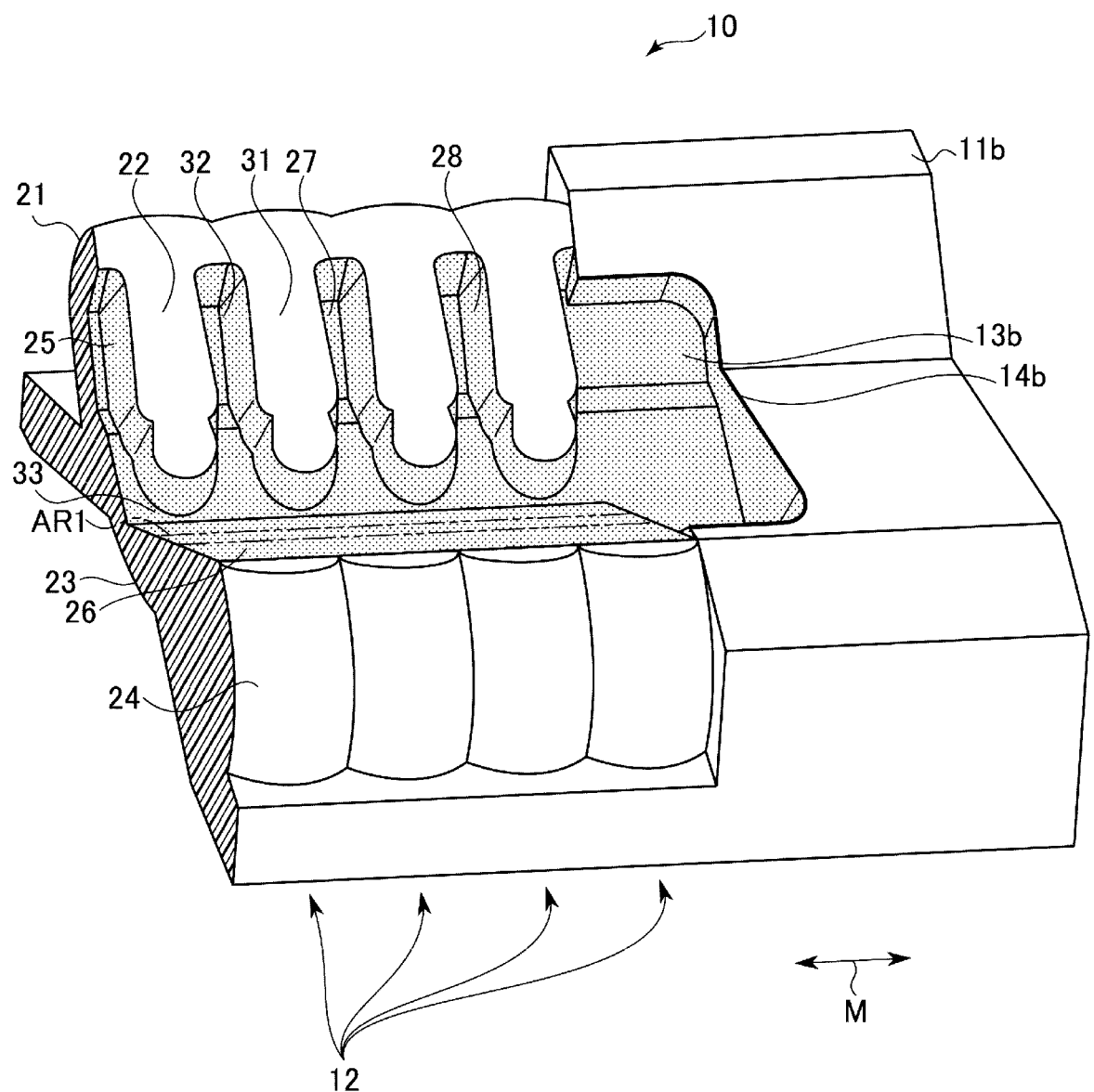
FIG. 7 is a perspective view of a part of the optical array illustrated in FIGS. 2 and 3.

The flange section 11a and the flange section 11b are explained with reference to FIGS. 6 and 7. FIGS. 6 and 7 are perspective views of the optical array 10.

The flange section 11a includes the escape region 13a surrounded by the edge 14a in three directions. In FIG. 6, the edge 14a is indicated by a thick line to clearly illustrate which portion the edge 14a is. The escape region 13a is a region formed to cause a part of the flange section 11a to communicate with at least one of the first concave section 32 closest to the flange section 11a and the second concave section 33. The first concave section 32 closest to the flange section 11a is a portion between the first convex section 31 and the flange section 11a. That is, the escape region 13a is surrounded by the communicating portion and the edge 14a. The shape of the escape region 13a is, for example, a groove shape or a concave shape. An upper part of the escape region 13a illustrated in FIG. 6 is opened. However, a part or the entire upper part of the escape region 13a may be closed.

The flange section 11b includes the escape region 13b surrounded by the edge 14b in three directions. In FIG. 7, the edge 14b is indicated by a thick line in order to clearly illustrate which portion the edge 14b is. The escape region 13b is a region formed to cause a part of the flange section 11b to communicate with at least one of the first concave section 32 closest to the flange section 11b and the second concave section 33. The first concave section 32 closest to the flange section 11b is a portion between the first convex section 31 and the flange section 11b. That is, the escape region 13b is surrounded by the communicating portion and the edge 14b. The shape of the escape region 13b is, for example, a groove shape or a recessed shape. An upper part of the escape region 13b illustrated in FIG. 6 is opened. However, a part or the entire upper part may be closed.

In FIGS. 6 and 7, an area AR1 is illustrated as an example of a position where the light blocking material is applied. The light blocking material applied in the area AR1 wets and spreads to form the light blocking layer 28 on the surface of the optical array 10. In FIGS. 6 and 7, a portion where the light blocking layer 28 is formed is indicated by dotted hatching. In FIGS. 6 and 7, the light blocking layer 28 is illustrated as being formed over the entire inner surfaces of the escape region 13a and the escape region 13b. However, as an actual product, the light blocking layer 28 may be formed in parts of the inner surfaces of the escape region 13a and the escape region 13b. For example, the light blocking material is started to be applied from a side close to the flange section 11a and is applied in order toward a side close to the flange section 11b. If the light blocking material is UV ink, for example, irradiation of an ultraviolet ray is started from the side close to the flange section 11a and the ultraviolet ray is irradiated in order toward the side close to the flange section 11b. A part of the light blocking material applied in the area AR1 flows into the escape regions 13.

Figure 8:
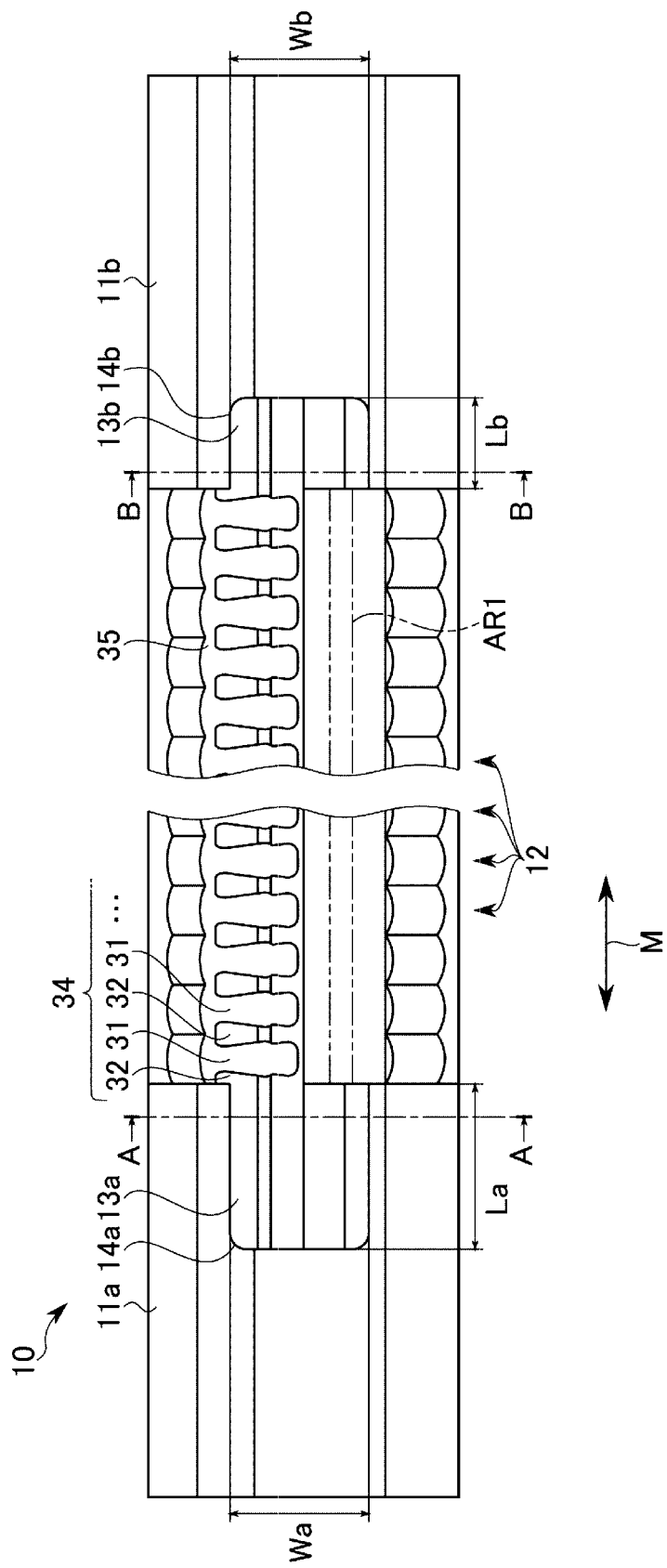
FIG. 8 is a plan view of the optical array illustrated in FIGS. 2 and 3.

The optical array 10 is further explained with reference to FIG. 8. FIG. 8 is a plan view of the optical array 10 viewed from a direction N illustrated in FIG. 5. The direction N is orthogonal to the main scanning direction M. In FIG. 8, a part of the optical array 10 is not shown.

The optical array 10 includes an uneven section 34. In the uneven section 34, a plurality of first convex sections 31 and a plurality of first concave sections 32 are alternately formed side by side. The plurality of first concave sections 32 and the second concave section 33 form one comb-like groove because the first concave sections 32 and the second concave section 33 communicate.

One side of the plurality of first convex sections 31 is connected to a second convex section 35. The second convex section 35 is located between the flange section 11a and the flange section 11b and extends from the flange section 11a to the flange section 11b. Consequently, the plurality of first convex sections 31 and the second convex section 35 form a comb-like convex section.

Figure 9:
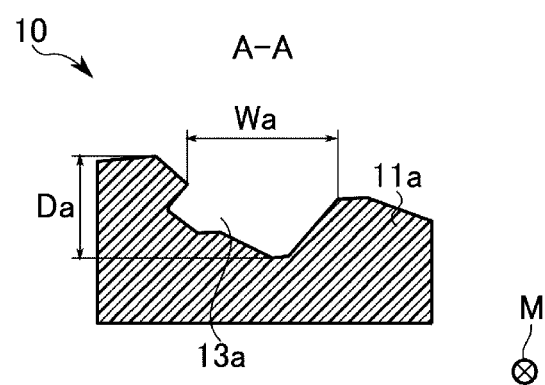
FIG. 9 is a sectional view of the optical array illustrated in FIG. 8.
Figure 10:
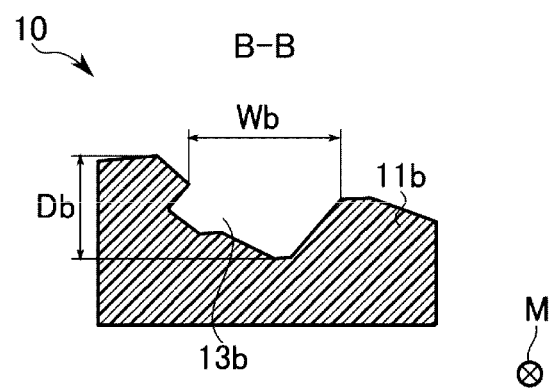
FIG. 10 is a sectional view of the optical array illustrated in FIG. 8.

The escape region 13a is longer than the escape region 13b in the longitudinal direction of the optical array 10. That is, length La of the escape region 13a and length Lb of the escape region 13b have a relation of La>Lb. An A-A line sectional view of the optical array 10 is illustrated in FIG. 9. An A-A line is a surface traversing the escape region 13a and perpendicular to the main scanning direction M. Further, a B-B line sectional view of the optical array 10 is illustrated in FIG. 10. A B-B line is a surface traversing the escape region 13b and perpendicular to the main scanning direction M. As it is seen from FIGS. 9 and 10, the A-A line sectional view and the B-B line sectional view have the same shape. Therefore, width Wa of the escape region 13a and width Wb of the escape region 13b are equal. Depth Da of the escape region 13a and depth Db of the escape region 13b are equal. Therefore, the volume of the escape region 13a is greater than the volume of the escape region 13b. The depth of the escape region may be a definition different from the definition illustrated in FIGS. 9 and 10. For example, the depth of the escape region may be depth of a portion different from the portion illustrated in FIGS. 9 and 10. The depth of the escape region may be average depth or the like of the escape region.

The optical array 10 according to the first embodiment includes the two escape regions 13 into which the applied light blocking material flows. Since an unnecessary light blocking material flows out to the escape regions 13, the optical array 10 can prevent the light blocking material from spreading to an unintended location, such as the mirror surface 22 and the lens surface 24.

In the optical array 10 according to the first embodiment, the length of the escape region 13a is longer than the length of the escape region 13b. Consequently, the volume of the escape region 13a is greater than the volume of the escape region 13b. The escape region 13a is close to the position where the application of the light blocking material is started. The escape region 13b is close to the position where the application of the light blocking material ends. A time from the application of the light blocking material until the irradiation of the ultraviolet ray is longer in the position where the application of the light blocking material is started. Therefore, a flowing-in amount of the light blocking material is greater in the escape region 13a than in the escape region 13b. Therefore, the optical array 10 according to the first embodiment has a shape suitable if there is a difference in the flowing-in amount of the light blocking material between the two escape regions 13.

Second Embodiment

The image forming apparatus 100 according to a second embodiment includes an optical array 10b instead of the optical array 10 according to the first embodiment. Explanation of the other components is omitted because the other components are the same as the components in the first embodiment.

Figure 11:
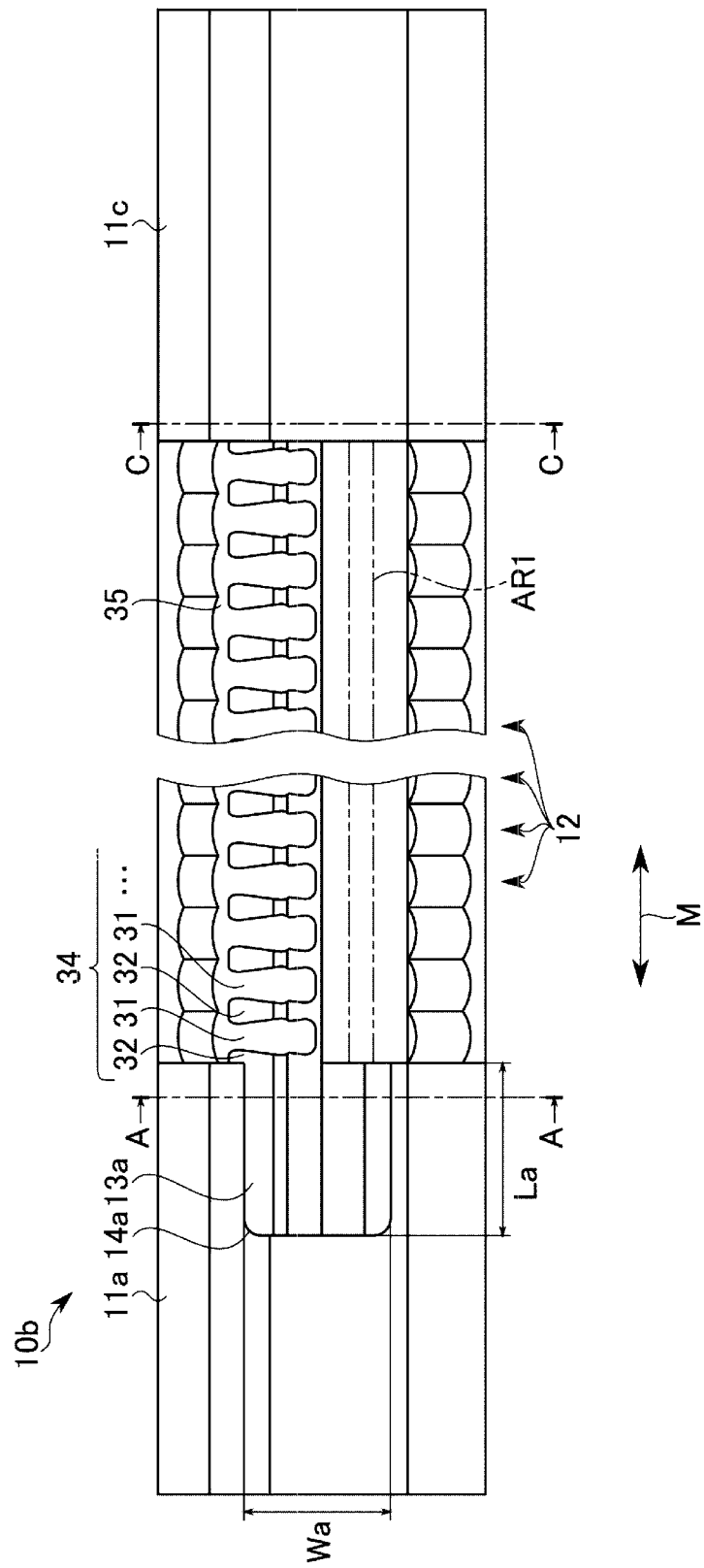
FIG. 11 is a plan view of an optical array according to a second embodiment illustrated in FIGS. 2 and 3.
Figure 12:
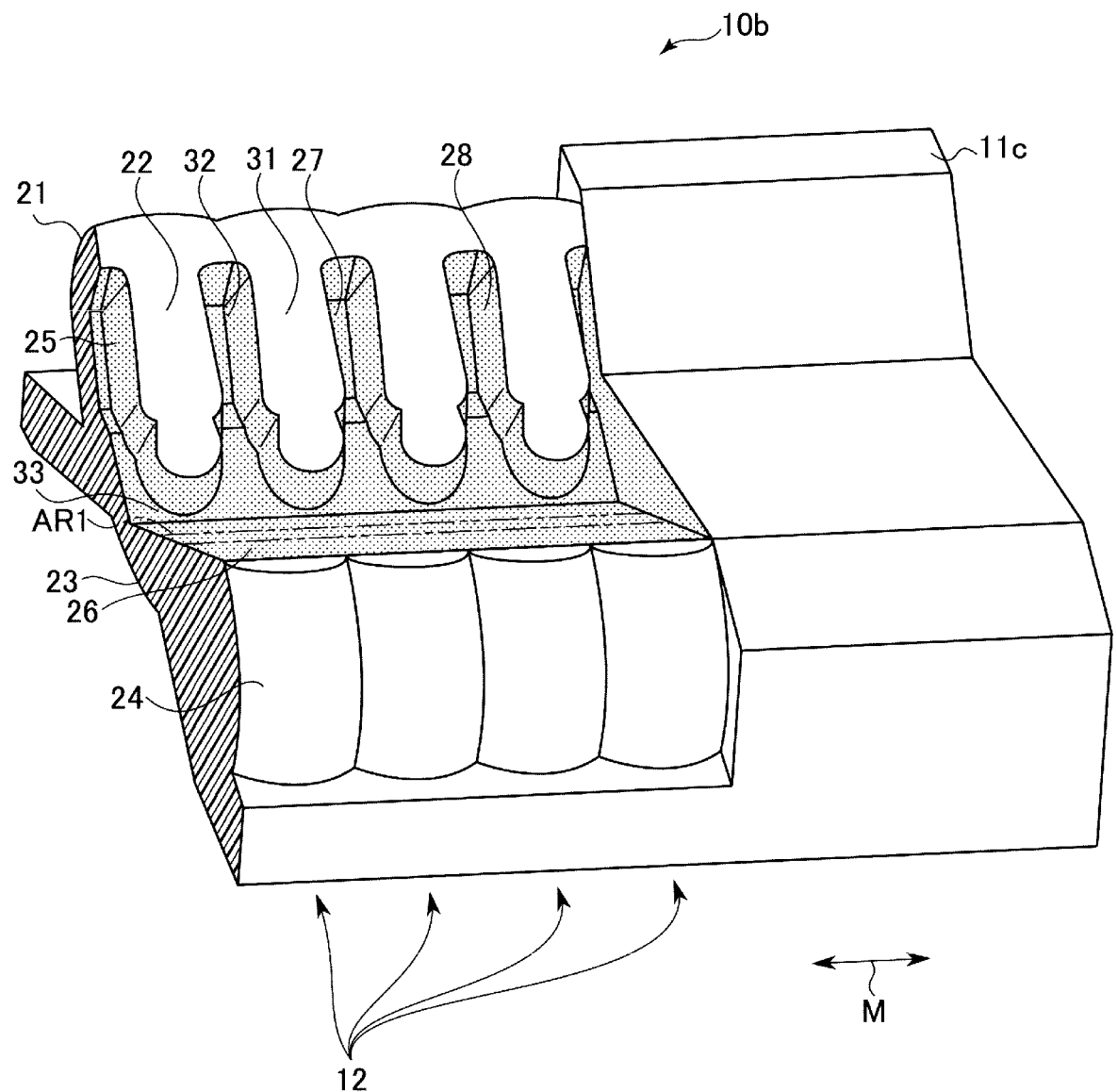
FIG. 12 is a perspective view of a part of the optical array illustrated in FIGS. 2 and 3.
Figure 13:
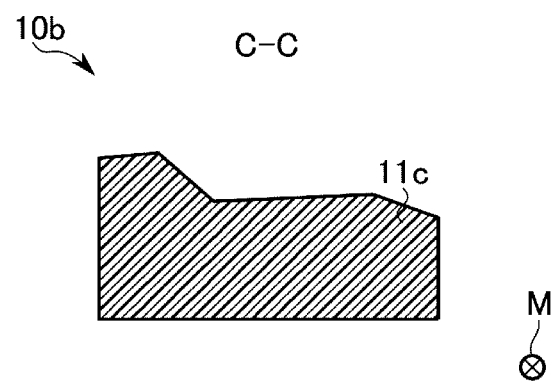
FIG. 13 is a sectional view of the optical array illustrated in FIG. 11.

The optical array 10b is explained with reference to FIGS. 11 to 13. FIG. 11 is a plan view of the optical array 10b viewed from the direction N illustrated in FIG. 5. FIG. 12 is a perspective view of a part of the optical array 10b. FIG. 13 is a C-C line sectional view of the optical array 10b.

The optical array 10b includes a flange section 11c instead of the flange section 11b of the optical array 10. The flange section 11c does not include the escape region 13 or the edge 14.

The escape region 13a surrounded by the edge 14a included in the optical array 10b is an example of the first region surrounded by the first edge.

The optical array 10b according to the second embodiment includes the escape region 13 only on the side close to the position where the application of the light blocking material is started. The light blocking material more easily flows out in the position where the application of the light blocking material is started than in the position where the application of the light blocking material ends. Therefore, the optical array 10b including the escape region 13 only on the side close to the position where the application of the light blocking material is started can prevent the light blocking material from spreading to an unintended position.

Third Embodiment

The image forming apparatus 100 according to a third embodiment includes an optical array 10c instead of the optical array 10 according to the first embodiment. Explanation of the other components is omitted because the other components are the same as the components in the first embodiment.

Figure 14:
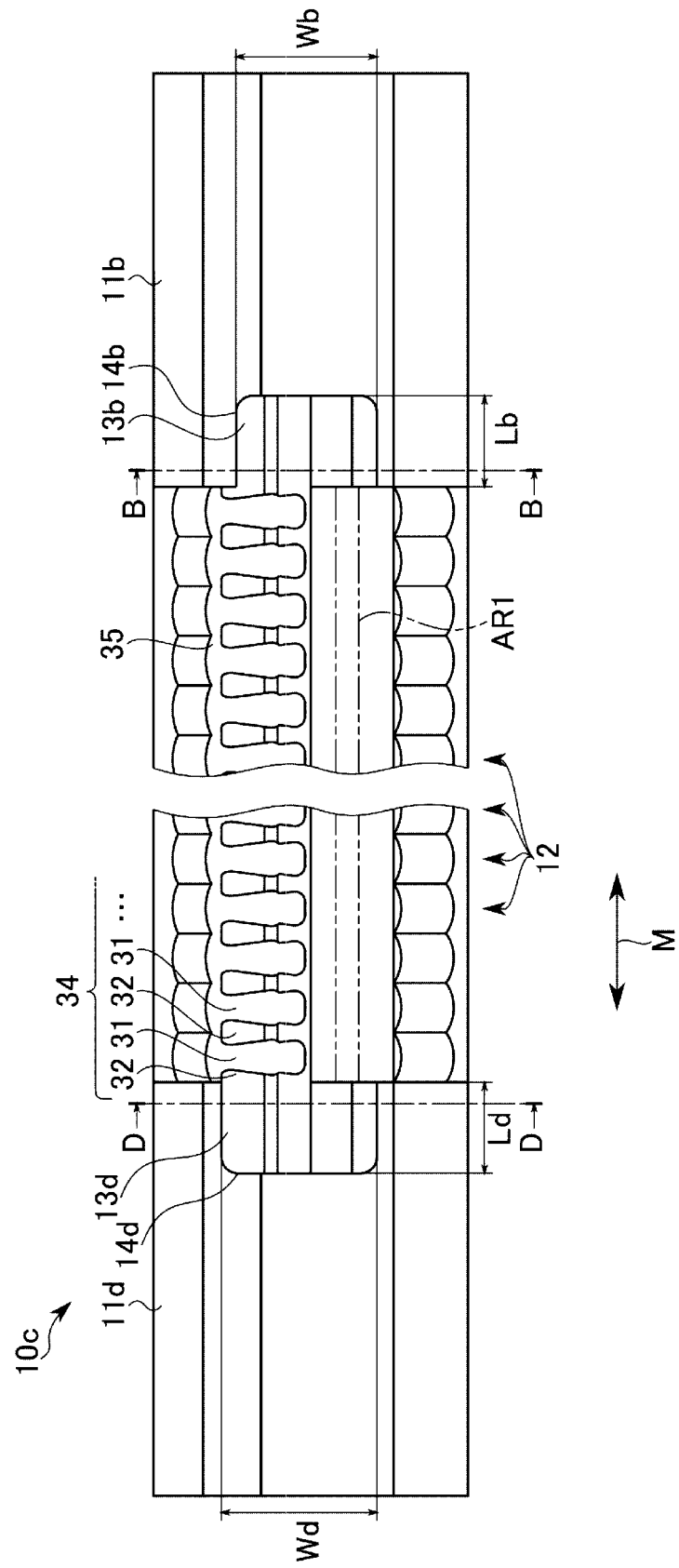
FIG. 14 is a plan view of an optical array according to the third embodiment illustrated in FIGS. 2 and 3.
Figure 15:
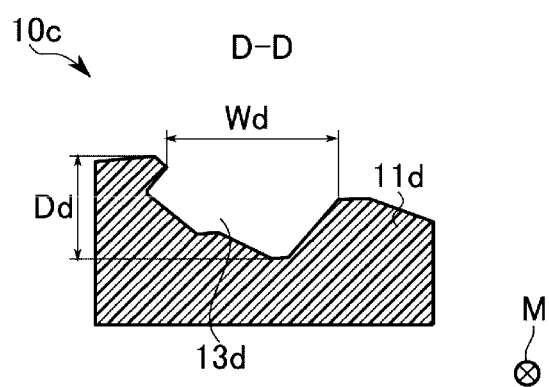
FIG. 15 is a sectional view of the optical array illustrated in FIG. 14.

The optical array 10c is explained with reference to FIGS. 14 and 15. FIG. 14 is a plan view of the optical array 10c viewed from the direction N illustrated in FIG. 5. FIG. 15 is a D-D line sectional view of the optical array 10c.

The optical array 10c includes a flange section 11d instead of the flange section 11a of the optical array 10. The flange section 11d includes an escape region 13d surrounded by an edge 14d in three directions. Length Ld of the escape region 13d and the length Lb of the escape region 13b are equal. Width Wd of the escape region 13d and the width Wb of the escape region 13b have a relation of Wb<Wd. Depth Dd of the escape region 13d and the depth Db of the escape region 13b are equal. Otherwise, the escape region 13d is the same as the escape region 13a. Consequently, the volume of the escape region 13d is larger than the volume of the escape region 13b.

As in the first embodiment, the optical array 10c according to the third embodiment includes the two escape regions 13 into which the applied light blocking material flows. Consequently, the optical array 10c according to the third embodiment can prevent the light blocking layer 28 from being formed in an unintended location, such as the mirror surface 22 and the lens surface 24.

In the optical array 10c according to the third embodiment, the width of the escape region 13d is greater than the width of the escape region 13b. Consequently, the volume of the escape region 13d is greater than the volume of the escape region 13b. The escape region 13d is close to the position where the application of the light blocking material is started. The escape region 13b is close to the position where the application of the light blocking material ends. A time from the application of the light blocking material until the irradiation of the ultraviolet ray is longer in the position where the application of the light blocking material is started. Therefore, a flowing-in amount of the light blocking material is greater in the escape region 13d than in the escape region 13b. Therefore, the optical array 10c according to the third embodiment has a shape suitable if there is a difference in the flowing-in amount of the light blocking material between the two escape regions 13.

Modifications explained below of the embodiments are also possible.

In the image forming apparatus 100 according to the first and third embodiments, the volumes of the two escape regions 13 are different because the lengths or the widths of the two escape regions 13 are different. However, the volumes of the two escape regions 13 may be different because the heights of the two escape regions 13 are different. The volumes of the two escape regions 13 may be different because any two or more of the lengths, the widths, and the heights of the two escape regions 13 are different.

The two escape regions 13 may have different shapes; for example, one escape region 13 is circular and the other escape region 13 is rectangular.

In the first and third embodiments, the volumes of the two escape regions 13 are different. However, the volumes of the two escape regions 13 may be the same.

The optical element 12 according to the first to third embodiments includes the two mirror surfaces, that is, the first mirror surface 22 and the second mirror surface 23. However, the optical element according to the embodiments may include three or more mirror surfaces. The optical element according to the embodiment may include only one mirror surface.

The example is explained in which the optical array 10 according to the first to third embodiments is used in the printer and the scanner of the electrophotographic type. However, the optical array 10 may be used in an optical device other than the printer and the scanner of the electrophotographic type. For example, the optical array 10 may be used in a silver salt print device that forms an image by focusing, on the surface of a photoconductive material, light from a light source in which a plurality of light elements that emit different colors are two-dimensionally disposed. The silver salt print device may be incorporated in a camera that captures an image.

While certain embodiments have been described, these embodiments have been presented by way of example only, and are not intended to limit the scope of the invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An optical array comprising:
   a plurality of optical elements arrayed in a longitudinal direction of the optical array, each of the optical elements comprises a convex portion, a part of which is surrounded by a first groove; and
   a pair of flange sections between which the optical elements are arrayed and having at least two surfaces, wherein a second groove that communicates with the first groove of each optical element is formed through said at least two surfaces of at least one of the flange sections.

2. The array according to claim 1, wherein the second groove is formed on both flange sections.

3. The array according to claim 2, wherein the second groove formed on one of the flange sections has a different volume from the second groove formed on the other flange section.

4. The array according to claim 2, wherein a length of the second groove formed on one of the flange sections is different from a length of the second groove formed on the other flange section in the longitudinal direction, a height direction of the array, or a direction perpendicular to both the longitudinal direction and the height direction.

5. The array according to claim 2, wherein the second groove formed on the one of the flange sections has a different shape from the second groove formed on the other flange section.

6. The array according to claim 1, wherein a light blocking layer is formed on one or more surfaces of the first and second grooves.

7. The array according to claim 6, wherein the light blocking layer is made of ultraviolet ink.

8. The array according to claim 1, wherein the convex portion of each optical element has a surface that forms a continuous surface extending between the flange sections.

9. The array according to claim 1, wherein
   each optical element comprises
      an incident surface through which light emitted from a light source enters the optical element,
      at least one reflection surface on which the light incident on the incident surface is reflected, and
      an emission surface through which the light reflected by the reflection surface exits the optical element, and
   the reflection surface forms a surface of the convex section.

10. The array according to claim 9, wherein
    the optical element comprises
       a first reflection surface on which the light incident on the incident surface is reflected, and
       a second reflection surface on which the light reflected on the first reflection surface is further reflected.

11. An optical device comprising:
    a light source configured to emit light; and
    an optical array through which an image is formed on an image surface of the optical device according to the emitted light and comprising
       a plurality of optical elements arrayed in a longitudinal direction of the optical array, each of the optical elements comprises a convex portion, a part of which is surrounded by a first groove, and
       a pair of flange sections between which the optical elements are arrayed and having at least two surfaces, wherein a second groove that communicates with the first groove of each optical element is formed through said at least two surfaces of at least one of the flange sections, wherein
       a light blocking layer is formed on one or more surfaces of the first and second grooves.

12. The device according to claim 11, wherein the second groove is formed on both flange sections.

13. The device according to claim 12, wherein the second groove formed on one of the flange sections has a different volume from the second groove formed on the other flange section.

14. The device according to claim 12, wherein a length of the second groove formed on one of the flange sections is a different from a length of the second groove formed on the other flange section in the longitudinal direction, a height direction of the array, or a direction perpendicular to both the longitudinal direction and the height direction.

15. The device according to claim 12, wherein the second groove formed on the one of the flange sections has a different shape from the second groove formed on the other flange section.

16. The device according to claim 11, wherein the light blocking layer is made of ultraviolet ink.

17. The device according to claim 11, wherein the convex portion of each optical element has a surface that forms a continuous surface extending between the flange sections.

18. The device according to claim 11, wherein
    each optical element comprises
       an incident surface through which the light emitted from the light source enters the optical element,
       at least one reflection surface on which the light incident on the incident surface is reflected, and
       an emission surface through which the light reflected by the reflection surface exits the optical element, and
    the reflection surface forms a surface of the convex section.

19. The device according to claim 18, wherein
    the optical element comprises
       a first reflection surface on which the light incident on the incident surface is reflected, and
       a second reflection surface on which the light reflected on the first reflection surface is further reflected.

20. An image forming apparatus comprising:
    a light source configured to emit light;
    an optical array through which an image is formed on an image surface of the image forming apparatus according to the emitted light and comprising
       a plurality of optical elements arrayed in a longitudinal direction of the optical array, each of the optical elements comprises a convex portion, a part of which is surrounded by a first groove, and
       a pair of flange sections between which the optical elements are arrayed and having at least two surfaces, wherein a second groove that communicates with the first groove of each optical element is formed through said at least two surfaces of at least one of the flange sections, wherein
       a light blocking layer is formed on one or more surfaces of the first and second grooves; and
    a printer configured to print the formed image on a sheet.

* * * * *